United States Patent
Canepa (10) Patent No.: US 9,423,977 B2
(45) Date of Patent: Aug. 23, 2016

(54) LOCK-FREE COMMUNICATION STORAGE REQUEST REORDERING

(71) Applicant: Seagate Technology LLC, Cupertino, CA (US)

(72) Inventor: Timothy Lawrence Canepa, Los Gatos, CA (US)

(73) Assignee: Seagate Technology LLC, Cupertino, CA (US)

(*) Notice: Subject to any disclaimer, the term of this patent is extended or adjusted under 35 U.S.C. 154(b) by 237 days.

(21) Appl. No.: 14/199,691

(22) Filed: Mar. 6, 2014

(65) Prior Publication Data

US 2014/0281171 A1    Sep. 18, 2014

Related U.S. Application Data

(60) Provisional application No. 61/786,170, filed on Mar. 14, 2013.

(51) Int. Cl.
*G06F 3/00*    (2006.01)
*G06F 3/06*    (2006.01)

(52) U.S. Cl.
CPC ............ *G06F 3/0659* (2013.01); *G06F 3/0619* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 7,444,642 B2* | 10/2008 | Minnick | ............... | G06F 13/128 710/24 |
| 2013/0198312 A1* | 8/2013 | Tamir | .................... | G06F 15/167 709/212 |

* cited by examiner

*Primary Examiner* — Idriss N Alrobaye
*Assistant Examiner* — Richard B Franklin
(74) *Attorney, Agent, or Firm* — Taylor English Duma LLP (57) ABSTRACT

Lock-free communication storage request reordering enables reduced latency and/or increased bandwidth in some usage scenarios, such as a multi-threaded driver context operating with a device, such as a storage device (e.g. a Solid-State Disk (SSD)) enabled to respond to a multiplicity of outstanding requests.

18 Claims, 5 Drawing Sheets

LOCK-FREE COMMUNICATION STORAGE REQUEST REORDERING

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application Ser. No. 61/786,170, filed Mar. 14, 2013, first named inventor Timothy Lawrence CANEPA, and entitled LOCK-FREE COMMUNICATION STORAGE REQUEST REORDERING.

BACKGROUND

1. Field

Advancements in (e.g. storage) device technology and manufacturing are needed to provide improvements in cost, profitability, performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

SYNOPSIS

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

| List of Reference Symbols in Drawings | |
|---|---|
| Ref. Symbol | Element Name |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 120 | Memory |
| 121 | Data Processing |
| 123 | Engines |
| 131 | Buffer |
| 133 | DMA |
| 135 | ECC-X |
| 137 | Memory |
| 141 | Map |
| 143 | Table |
| 144 | Queue Control |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 201 | Driver |
| 202 | Controller |
| 203 | Requests |
| 204 | Completions |
| 210 | Request Queue |
| 211 | Request Queue tail (RQt) |
| 212 | Request Queue head (RQh) |
| 220 | Request Queue entries (RQentries) |
| 221 | Request Queue entry (RQe) |
| 222 | Request Queue entry |
| 229 | Request Queue entry |
| 230 | Completion Queue |
| 231 | Completion Queue tail (CQt) |
| 232 | Completion Queue head (CQh) |

-continued

List of Reference Symbols in Drawings

| Ref. Symbol | Element Name |
|---|---|
| 240 | Completion Queue entries (CQentries) |
| 241 | Completion Queue entry (CQe) |
| 242 | Completion Queue entry |
| 249 | Completion Queue entry |
| 250 | Completion Status Table |
| 260 | Completion Status Table entries (CSTentries) |
| 261 | Completion Status Table entry (CSe) |
| 262 | Completion Status Table entry |
| 269 | Completion Status Table entry |
| 270 | Unique ID (uID) |
| 300C | Controller Actions |
| 300D | Driver Actions |
| 301D | Start |
| 302D | Generate Request |
| 303D | Assign Unique ID |
| 304D | Allocate Status Entry |
| 305D | Add Request |
| 306C | Remove Request |
| 307C | Service Request |
| 308C | Complete Request |
| 308D | Receive Data/Status |
| 309C | Update Status |
| 310C | Update Head |
| 338U | Unique ID |
| 399C | End |
| 400C | Controller Actions |
| 400D | Driver Actions |
| 401D | Start |
| 402D | Generate Request |
| 403D | Add Request |
| 404D | Assign Unique ID |
| 405D | Allocate Status Entry |
| 406C | Remove Request |
| 407C | Service Request |
| 408C | Complete Request |
| 408D | Receive Data/Status |
| 409C | Update Status |
| 410C | Wait |
| 411C | Update Head |
| 448U | Unique ID |
| 499C | End |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (such as: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AHCI | Advanced Host Controller Interface |
| API | Application Program Interface |
| ATA | Advanced Technology Attachment (AT Attachment) |
| BCH | Bose Chaudhuri Hocquenghem |
| CD | Compact Disk |
| CF | Compact Flash |
| CPU | Central Processing Unit |
| CRC | Cyclic Redundancy Check |
| DAS | Direct Attached Storage |
| DDR | Double-Data-Rate |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | external Serial Advanced Technology Attachment |
| GPS | Global Positioning System |
| HDD | Hard Disk Drive |
| I/O | Input/Output |
| IC | Integrated Circuit |
| IDE | Integrated Drive Electronics |
| LAN | Local Area Network |
| LBA | Logical Block Address |
| LDPC | Low-Density Parity-Check |
| MLC | Multi-Level Cell |
| MMC | MultiMediaCard |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| POS | Point Of Sale |
| RAID | Redundant Array of Inexpensive/Independent Disks |
| RASIE | Redundant Array of Silicon Independent Elements |
| ReRAM | Resistive Random Access Memory |
| RS | Reed-Solomon |
| SAN | Storage Attached Network |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDR | Single-Data-Rate |
| SLC | Single-Level Cell |
| SMART | Self-Monitoring Analysis and Reporting Technology |

-continued

| Acronym | Description |
|---|---|
| SSD | Solid-State Disk/Drive |
| UFS | Unified Flash Storage |
| USB | Universal Serial Bus |
| VF | Virtual Function |
| WAN | Wide Area Network |

In various embodiments and/or usage scenarios, lock-free communication storage request reordering is advantageous and improves one or more of: performance, reliability, unit cost, and development cost of one or more devices such as storage devices (e.g. an SSD) or system including same.

Example Embodiments

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
managing a request queue, the managing comprising performing request addition via a tail of the request queue and performing request removal via a head of the request queue;
adding a particular request to the request queue and assigning a unique identifier to the particular request based at least in part on an offset between the tail and the head at the time of the adding;
completing the particular request;
updating a particular one of a plurality of completion status entries as identified by the unique identifier;
waiting until all requests of the request queue that are older than the particular request are completed; and
after the waiting, updating the request queue head.

EC2) The method of EC1, wherein after the updating of the request queue head, resources of the request queue associated with the particular request are available for reuse.

EC3) The method of EC1, wherein the adding is performed by driver software of a host.

EC4) The method of EC1, wherein the waiting is performed by a controller of a device enabled to service the particular request.

EC5) The method of EC1, wherein the waiting is performed by a controller of a device enabled to service the particular request at least in part via operation of a flash memory interface.

EC6) The method of EC1, wherein the waiting is performed by a controller of a device enabled to service the particular request at least in part via accessing of at least one flash memory.

EC7) The method of EC1, wherein the particular request is communicated at least in part via a storage interface that is compatible with at least one storage interface standard.

EC8) A system comprising:
means for managing a request queue, the means for managing comprising means for performing request addition via a tail of the request queue and means for performing request removal via a head of the request queue;
means for adding a particular request to the request queue and means for assigning a unique identifier to the particular request based at least in part on an offset between the tail and the head at the time of the adding;
means for completing the particular request;
means for updating a particular one of a plurality of completion status entries as identified by the unique identifier;
means for waiting until all requests of the request queue that are older than the particular request are completed; and
means for, after the waiting, updating the request queue head.

EC9) The system of EC8, wherein the means for waiting is comprised in a controller of a device enabled to service the particular request.

EC10) A tangible computer readable medium having a set of instructions stored therein that when executed by one or more processing elements cause the processing elements to collectively perform and/or control operations comprising:
managing a request queue, the managing comprising performing request addition via a tail of the request queue and performing request removal via a head of the request queue;
adding a particular request to the request queue and assigning a unique identifier to the particular request based at least in part on an offset between the tail and the head at the time of the adding;
completing the particular request;
updating a particular one of a plurality of completion status entries as identified by the unique identifier;
waiting until all requests of the request queue that are older than the particular request are completed; and
after the waiting, updating the request queue head.

EC11) The tangible computer readable medium of EC10, wherein at least one of the processing elements is comprised in a controller of a device enabled to service the particular request.

EC12) An apparatus comprising:
logic circuitry enabled to manage a request queue at least in part by performing request addition via a tail of the request queue and performing request removal via a head of the request queue;
logic circuitry enabled to add a particular request to the request queue and to assign a unique identifier to the particular request based at least in part on an offset between the tail and the head at the time of the adding;
logic circuitry enabled to complete the particular request;
logic circuitry enabled to update a particular one of a plurality of completion status entries as identified by the unique identifier;
logic circuitry enabled to wait until all requests of the request queue that are older than the particular request are completed; and
logic circuitry enabled to, after the waiting, update the request queue head.

EC13) The apparatus of EC12, wherein at least some of the logic circuitry elements are comprised in a controller of a device enabled to service the particular request.

EC14) Any of the foregoing ECs having or referring to a storage interface standard, wherein the storage interface standard comprises one or more of
a Universal Serial Bus (USB) interface standard,
a Compact Flash (CF) interface standard,
a MultiMediaCard (MMC) interface standard,
an embedded MMC (eMMC) interface standard,
a Thunderbolt interface standard,
a UFS interface standard,
a Secure Digital (SD) interface standard, a Memory Stick interface standard,
an xD-picture card interface standard,
an Integrated Drive Electronics (IDE) interface standard,
a Serial Advanced Technology Attachment (SATA) interface standard,
an external SATA (eSATA) interface standard,
a Small Computer System Interface (SCSI) interface standard,
a Serial Attached Small Computer System Interface (SAS) interface standard,
a Fibre Channel interface standard,
an Ethernet interface standard, and
a Peripheral Component Interconnect express (PCIe) interface standard.

EC15) Any of the foregoing ECs having or referring to a flash memory interface, wherein the flash memory interface is compatible with one or more of
an Open NAND Flash Interface (ONFI),
a Toggle-mode interface,
a Double-Data-Rate (DDR) synchronous interface,
a DDR2 synchronous interface,
a synchronous interface, and
an asynchronous interface.

EC16) Any of the foregoing ECs having or referring to a host, wherein the host comprises one or more of
a computer,
a workstation computer,
a server computer,
a storage server,
a Storage Attached Network (SAN),
a Network Attached Storage (NAS) device,
a Direct Attached Storage (DAS) device,
a storage appliance,
a Personal Computer (PC),
a laptop computer,
a notebook computer,
a netbook computer,
a tablet device or computer,
an ultrabook computer,
an electronic reading device (an e-reader),
a Personal Digital Assistant (PDA),
a navigation system,
a (handheld) Global Positioning System (GPS) device,
an automotive control system,
an automotive media control system or computer,
a printer, copier or fax machine or all-in-one device,
a Point Of Sale (POS) device,
a cash-register,
a media player,
a television,
a media recorder,
a Digital Video Recorder (DVR),
a digital camera,
a cellular handset,
a cordless telephone handset, and
an electronic game.

EC17) Any of the foregoing ECs having or referring to at least one flash memory, wherein at least a portion of the at least one flash memory comprises one or more of
NAND flash technology storage cells, and
NOR flash technology storage cells.

EC18) Any of the foregoing ECs having or referring to at least one flash memory, wherein at least a portion of the at least one flash memory comprises one or more of
Single-Level Cell (SLC) flash technology storage cells, and
Multi-Level Cell (MLC) flash technology storage cells.

EC19) Any of the foregoing ECs having or referring to at least one flash memory, wherein at least a portion of the at least one flash memory comprises one or more of
polysilicon technology-based charge storage cells, and
silicon nitride technology-based charge storage cells.

EC20) Any of the foregoing ECs having or referring to at least one flash memory, wherein at least a portion of the at least one flash memory comprises one or more of
two-dimensional technology-based flash memory technology, and
three-dimensional technology-based flash memory technology.

System

In some embodiments, an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level redundancy and/or error correction, higher-level redundancy and/or error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as a SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

Figure 1A:
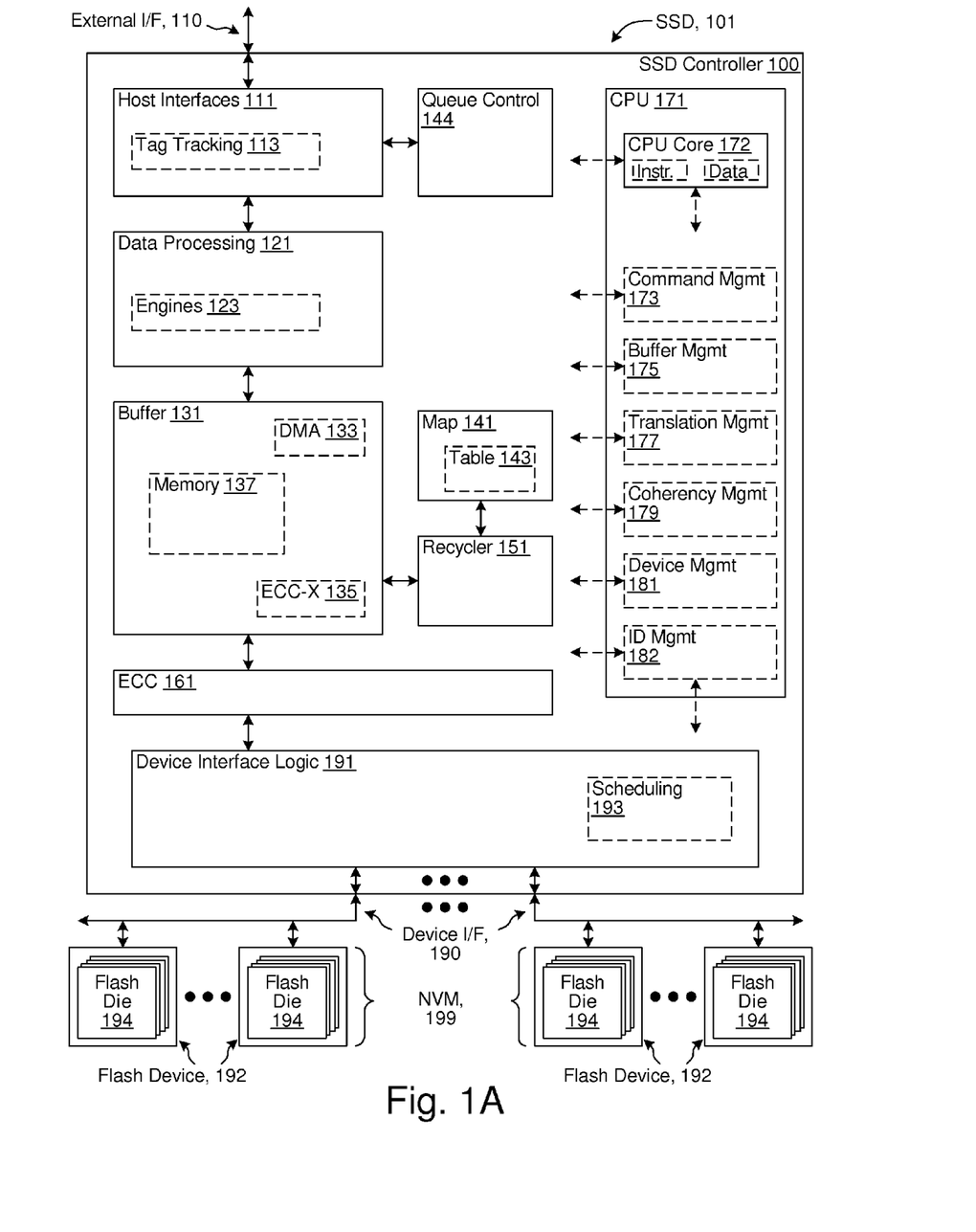
FIG. 1A illustrates selected details of an embodiment of a Solid-State Disk (SSD) including an SSD controller enabled to perform lock-free communication storage request reordering.

FIG. 1A illustrates selected details of an embodiment of an SSD including an SSD controller enabled to perform lock-free communication storage request reordering. The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more instances of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each of Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, Device Interfaces 190 are organized as: one or more busses with one or more instances of Flash Device 192 per bus; one or more groups of busses with one or more instances of Flash Device 192 per bus, having busses in a group generally accessed in parallel; or any other organization of one or more instances of Flash Device 192 onto Device Interfaces 190.

Continuing in FIG. 1A, SSD Controller 100 has one or more modules, such as Host Interfaces 111, Queue Control 144, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113 and/or Queue Control 144. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts, an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more instances of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE), with redundancy at a flash device level (e.g., multiple ones of Flash Device 192) and/or a flash die level (e.g., Flash Die 194) instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information; and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
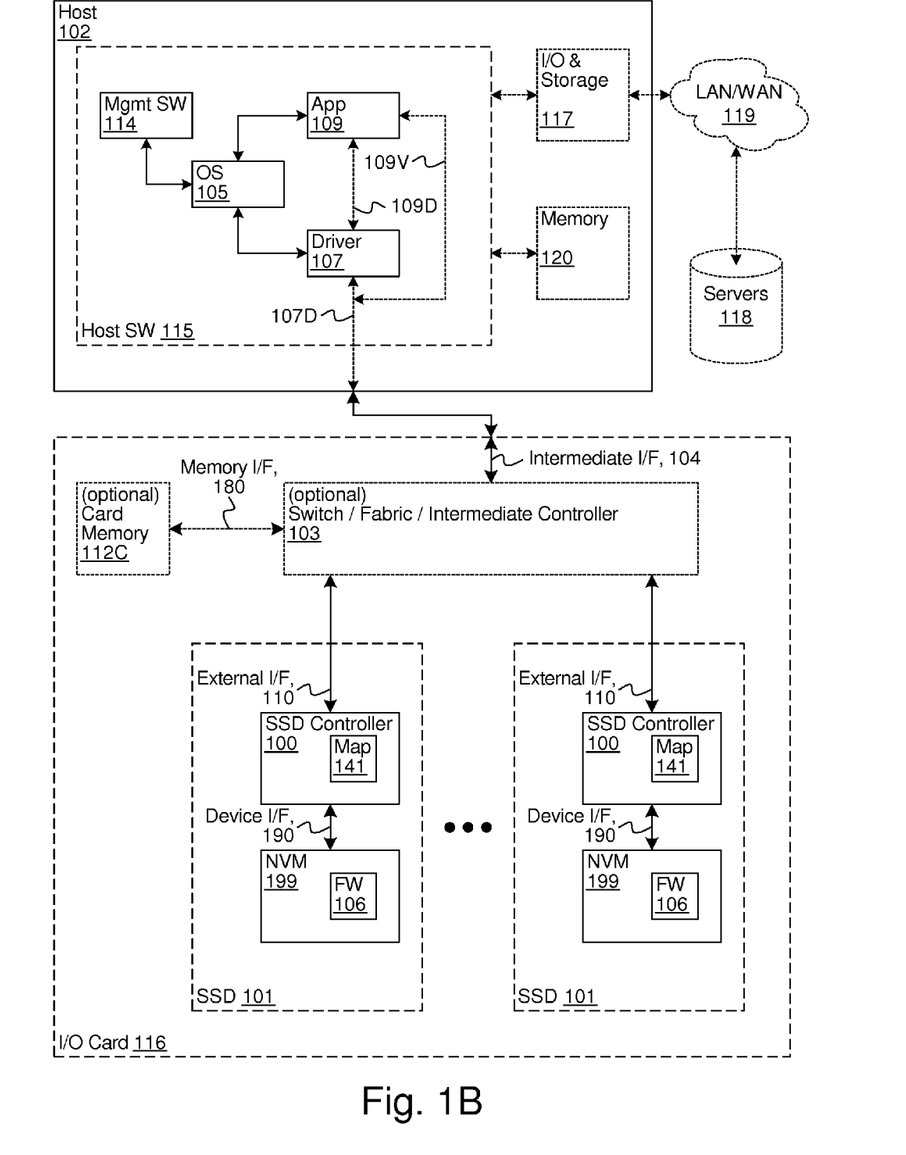
FIG. 1B illustrates selected details of various embodiments of systems including one or more instances of the SSD of FIG. 1A.

FIG. 1B illustrates selected details of various embodiments of systems including one or more instances of the SSD of FIG. 1A coupled (directly or indirectly) to a host that is enabled to operate with lock-free communication storage request reordering. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software←→I/O Device Communication, e.g. data sent/received to/from one or more of the instances of SSD 101 and from/to any one or more of OS 105 via Driver 107, Driver 107, and Application 109, either via Driver 107, or directly as a VF. In various embodiments, Host 102 includes various volatile and/or non-volatile memory resources, as illustrated by Memory 120, variously accessible via elements of 115 and/or instances of SSD 101.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor-specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application←→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments with Host 102 as a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software and/or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Lock-Free Communication Storage Request Reordering

Figure 2:
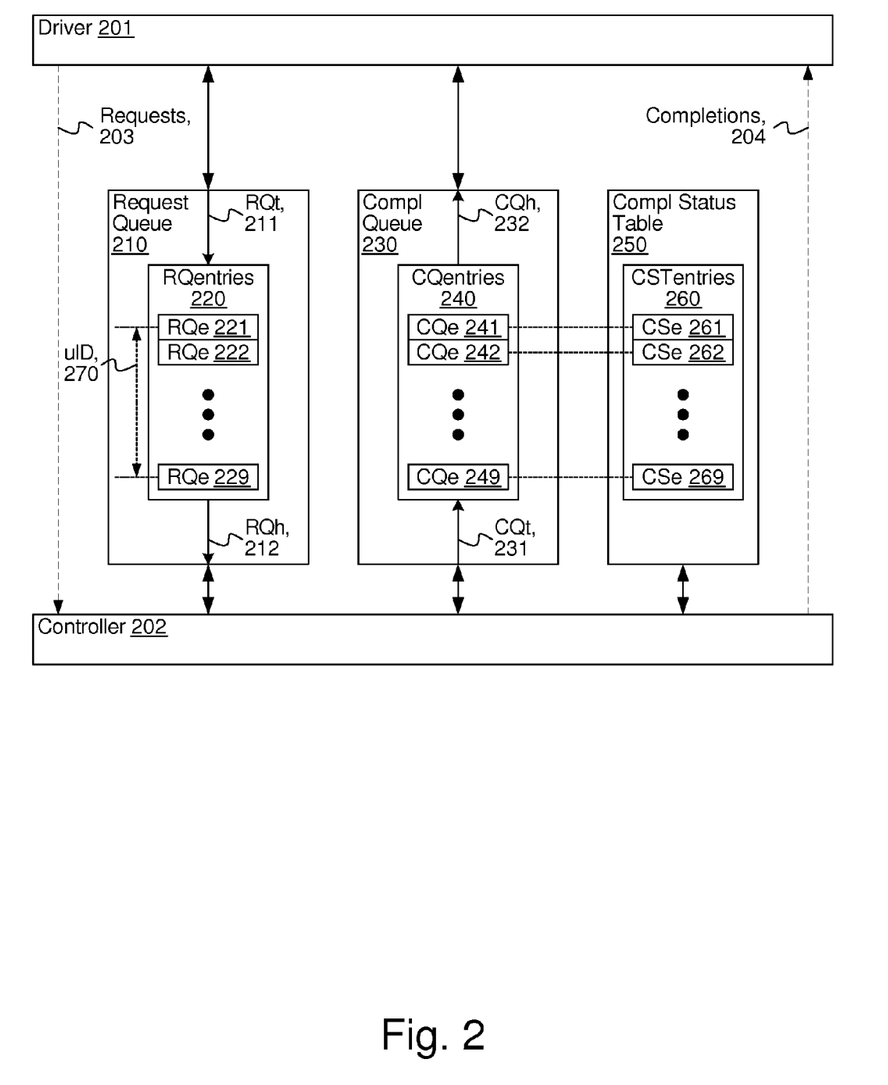
FIG. 2 illustrates selected details of various embodiments of system contexts using lock-free communication storage request reordering.

FIG. 2 illustrates selected details of various embodiments of system contexts using lock-free communication storage request reordering. Driver 201 (e.g. as embodied by Driver 107 of FIG. 1B) is enabled for communication with Controller 202 (e.g. as embodied by an instance of SSD Controller 100 of FIG. 1B). Communication of requests (e.g. read and/or write commands) from the Driver to the Controller is illustrated conceptually by dashed-arrow Requests 203. Communication of completions (of the Requests) from the Controller to the Driver is illustrated conceptually by dashed-arrow Completions 204.

Facilitating communication, tracking, and managing of the Requests and Completions are Request Queue 210, Completion Queue 230, and Completion Status Table 250, coupled to one or more of the Driver and the Controller.

Request Queue 210 includes a plurality of entries (Request Queue entries (RQentries) 220), illustrated conceptually as Request Queue entry (RQe) elements 221, 222 . . . 229. Entries are added (e.g. inserted) via a tail (e.g. pointer), as illustrated conceptually by Request Queue tail (RQt) 211. Entries are removed (e.g. obtained) via a head (e.g. pointer), as illustrated conceptually by Request Queue head (RQh) 212. Each of the Request Queue entries is enabled to store request information (e.g. type such as read or write, parameters such as one or more LBAs, and other information for processing the request).

Completion Queue 230 includes a plurality of entries (Completion Queue entries (CQentries) 240), illustrated conceptually as Completion Queue entry (CQe) elements 241, 242 . . . 249. Entries are added (e.g. inserted) via a tail (e.g. pointer), as illustrated conceptually by Completion Queue tail (CQt) 231. Entries are removed (e.g. obtained) via a head (e.g. pointer), as illustrated conceptually by Completion Queue head (CQh) 232. Each of the Completion Queue entries is enabled to store completion information associated with corresponding one or more requests from the Request Queue (e.g. successful or error status).

Completion Status Table 250 includes a plurality of entries (Completion Status Table entries (CSTentries) 260), illustrated conceptually as Completion Status Table entry (CSe) elements 261, 262 . . . 269. Each of the Completion Status Table entries is enabled to store status information relating to a corresponding request having a corresponding allocated entry in Completion Queue 230. Thus there is a one to one correspondence between each of the Completion Status Table entries and a corresponding respective entry of the Completion Queue (e.g. Completion Status Table entry 261 is associated with Completion Queue entry 241, and so forth).

During operation, the number of (valid) entries in the Request Queue (and correspondingly the Completion Queue) grows/shrinks as entries are added/removed, optionally subject to one or more implementation restrictions (e.g. a maximum number of entries due to limited storage space for the entries). Unique ID 270 conceptually represents a unique identifier assigned, in some embodiments and/or usage scenarios, based on an offset between Request Queue tail 211 and Request Queue head 212 at a time of adding an element to Request Queue 210. For example, the Request Queue is empty. A first request is added to the Request Queue and the offset is one. A second request is added to the Request Queue while the first request remains in the Request Queue, and the offset is two. A third request is added while the first and second requests remain, and the offset is three. Then the first request is removed, and the offset is two.

In various embodiments, all or any portions of any one or more of Request Queue 210, Completion Queue 230, and Completion Status Table 250 are implemented in hardware logic circuitry (e.g. as all or any portions of Queue Control 144 of FIG. 1A), volatile and/or non-volatile memory (e.g. as all or any portions of Memory 120, Card Memory 112C, and/or NVM 199 of FIG. 1B). In some embodiments, all or any portions of Request Queue 210, Completion Queue 230, Completion Status Table 250, and/or associated control resources are implemented wholly or partially in Controller 202.

Figure 3:
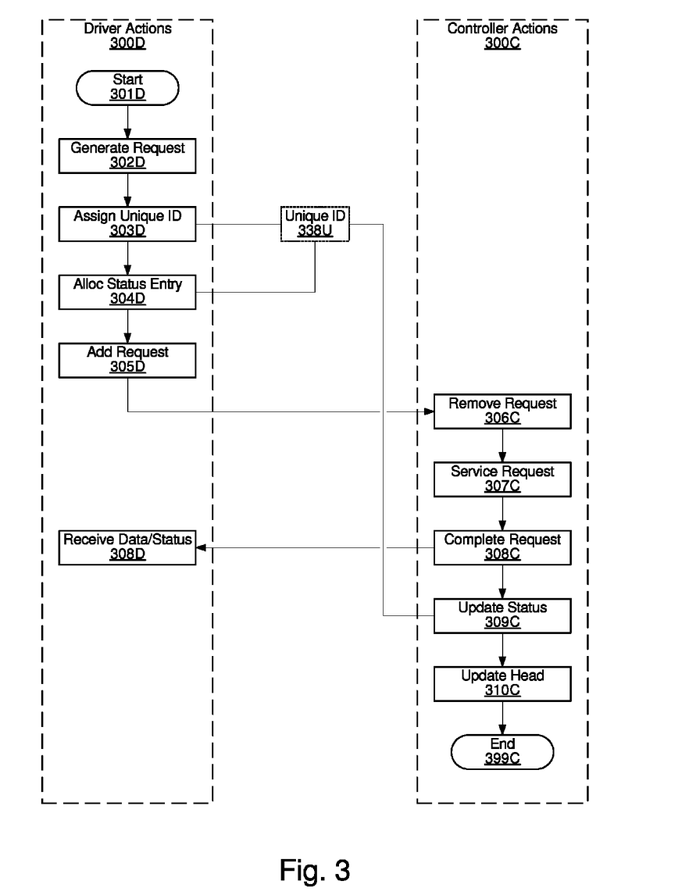
FIG. 3 illustrates selected details of various embodiments of processing for communication storage request reordering.

FIG. 3 illustrates selected details of various embodiments of processing for communication storage request reordering. The illustrated actions are performed variously by a driver (e.g. Driver 107 of FIG. 1B) as illustrated by a dashed-box in the left-hand portion of the figure (Driver Actions 300D) and a controller of a device such as a storage device (e.g. an instance of SSD Controller 100 of FIG. 1B) as illustrated by the dashed-box in the right-hand portions of the figure (Controller Actions 300C). In summary, the actions enable out-of-order communication of requests (e.g. read and/or write commands) and/or processing thereof. In operating contexts where requests are generated by a single agent, no locking is used. In operating contexts where requests are generated by a plurality of agents, selective locking is used.

More specifically, the actions begin (Start 301D). The driver creates a request, such as a read or write request (Generate Request 302D). Then the driver determines a unique identifier and associates it with the request (Assign Unique ID 303D). Then the driver sets aside a completion status entry for use associated with the request (Allocate Status Entry 304D) and identified by the unique identifier (Unique ID 338U). Then the driver inserts the request onto a request queue (Add Request 305D) via a tail (e.g. pointer).

In response, the controller obtains the request via a head (e.g. pointer) from the request queue (Remove Request 306C). Then the controller performs operations in accordance with the request, such as by reading and/or writing non-volatile memory elements to carry out the request (Service Request 307C). Then the controller finishes performing the request, such as by sending success/fail information and/or data associated with the reading and/or writing (Complete Request 308C) to the driver (Receive Data/Status 308D). Then the controller updates the completion status entry that was previously set aside by the driver (Update Status 309C), using the unique identifier previously determined by the driver (Unique ID 338U). Then the controller modifies the head (Update Head 310C). The actions are then complete (End 399C), and various resources used by the request (e.g. the request queue entry, the completion status entry, and/or an associated completion queue entry) are free for reuse by another request.

Note that although illustrated and described as if 306C follows 305D without delay (e.g. immediately), in various circumstances 306C follows 305D after an indeterminate delay of time and/or events. For example, a particular request is queued, and then a plurality of previously queued requests are processed (e.g. in accordance with 300D and/or 300C) before processing of the particular request.

In operating contexts where requests are generated by a single agent (e.g. a single instantiation of a driver on a single thread of a single processing element), no locking is used. In operating contexts where requests are generated by a plurality of agents (e.g. a plurality of instantiations of a driver, such as a multi-threaded operating environment), locking is used around the determining and associating of the unique identifier (Assign Unique ID 303D). For example, a driver instance obtains a single-owner lock resource before the determining and associating, performs the determining and associating, and then releases the single-owner lock resource for use for subsequent determining and associating.

In various embodiments and/or usage scenarios, all or any portions of any one or more elements of FIG. 3 are related to all or any portions of various elements of FIG. 2. For example, Driver Actions 300D and Controller Actions 300C are respectively performed by Driver 201 and Controller 202 of FIG. 2. Unique ID 338U is conceptually represented by Unique ID 270 of FIG. 2. The completion status entry allocated in 304D is an entry of Completion Status Table 250 of FIG. 2. The request queue and the tail related to 305D are represented by Request Queue 210 and Request Queue tail 211, respectively of FIG. 2. The request queue head related to 306C is represented by Request Queue head 212 of FIG. 2.

Figure 4:
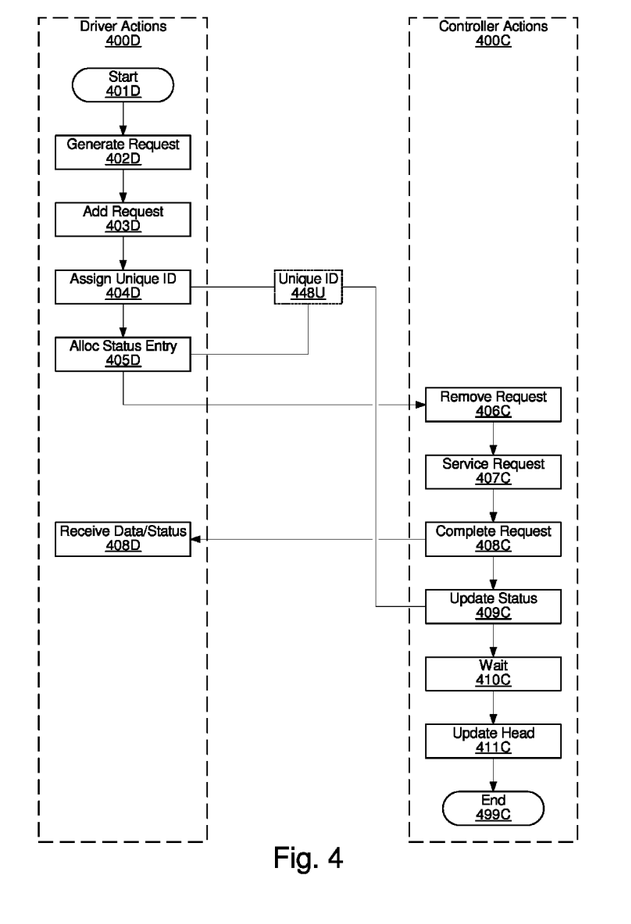
FIG. 4 illustrates selected details of various embodiments of processing for lock-free communication storage request reordering.

FIG. 4 illustrates selected details of various embodiments of processing for lock-free communication storage request reordering. The illustrated actions are performed variously by a driver (e.g. Driver 107 of FIG. 1B) as illustrated by a dashed-box in the left-hand portion of the figure (Driver Actions 400D) and a controller of a device such as a storage device (e.g. an instance of SSD Controller 100 of FIG. 1B) as illustrated by the dashed-box in the right-hand portions of the figure (Controller Actions 400C). In summary, the actions enable lock-free out-of-order communication of requests (e.g. read and/or write commands) and/or processing thereof. In operating contexts where requests are generated by a single agent, as well as operating contexts where requests are generated by a plurality of agents, no locking is used.

More specifically, the actions begin (Start 401D). The driver creates a request, such as a read or write request (Generate Request 402D). Then the driver inserts the request onto a request queue (Add Request 403D) via a tail (e.g. pointer). Then the driver determines a unique identifier and associates it with the request (Assign Unique ID 404D). Then the driver sets aside a completion status entry for use associated with the request (Allocate Status Entry 405D) and identified by the unique identifier (Unique ID 448U).

In response, the controller obtains the request via a head (e.g. pointer) from the request queue (Remove Request 406C). Then the controller performs operations in accordance with the request, such as by reading and/or writing non-volatile memory elements to carry out the request (Service Request 407C). Then the controller finishes performing the request, such as by sending success/fail information and/or data associated with the reading and/or writing (Complete Request 408C) to the driver (Receive Data/Status 408D). Then the controller updates the completion status entry that was previously set aside by the driver (Update Status 409C), using the unique identifier previously determined by the driver (Unique ID 448U). Then the controller waits for completion of all previously received (e.g. older) requests to complete, such as all requests having unique identifiers that are "lower" than the (instant) unique identifier (Wait 410C). Then the controller modifies the head (Update Head 411C). The actions are then complete (End 499C), and various resources used by the request (e.g. the request queue entry, the completion status entry, and/or an associated completion queue entry) are free for reuse by another request.

Similarly as noted for FIG. 3, although illustrated and described as if 406C follows 405D without delay (e.g. immediately), in various circumstances 406C follows 405D after an indeterminate delay of time and/or events. For example, a particular request is queued, and then a plurality of previously queued requests are processed (e.g. in accordance with 300D and/or 300C) before processing of the particular request.

In various embodiments and/or usage scenarios, all or any portions of any one or more elements of FIG. 4 are related to all or any portions of various elements of FIG. 2. For example, Driver Actions 400D and Controller Actions 400C are respectively performed by Driver 201 and Controller 202 of FIG. 2. The request queue and the tail related to 403D are represented by Request Queue 210 and Request Queue tail 211, respectively of FIG. 2. Unique ID 448U is conceptually represented by Unique ID 270 of FIG. 2. The completion status entry allocated in 405D is an entry of Completion Status Table 250 of FIG. 2. The request queue head related to 406C is represented by Request Queue head 212 of FIG. 2.

In various embodiments, all or any portions of controller actions illustrated in any one or more of FIGS. 3-4 are performed wholly or in part by any one or more of execution of one or more firmware modules, by operation of one or more state machines, and/or by one or more hardware logic modules. For example, Queue Control 144 of FIG. 1A implements one or more portions of one or more controller actions illustrated in any one or more of FIGS. 3-4.

Example Implementation Techniques

In some embodiments, various combinations of all or any portions of operations performed by a system, host, device, device controller, storage device, storage device controller, SSD, or SSD controller enabled to operate in accordance with lock-free communication storage request reordering, a computing-host flash memory controller, and/or an SSD controller (such as SSD Controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "comprises", "comprising", "includes", and "including" are specifically intended to be construed as abstractions describing logical sets of open-ended (non-restrictive) scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising:
    managing a request queue, the managing comprising performing request addition via a tail of the request queue and performing request removal via a head of the request queue;
    adding a particular request to the request queue and assigning a unique identifier to the particular request based at least in part on an offset between the tail and the head at the time of the adding;
    completing the particular request;
    updating a particular one of a plurality of completion status entries as identified by the unique identifier;
    waiting until all requests of the request queue that are older than the particular request are completed; and
    after the waiting, updating the request queue head.

2. The method of claim 1, wherein after the updating of the request queue head, resources of the request queue associated with the particular request are available for reuse.

3. The method of claim 1, wherein the adding is performed by driver software of a host.

4. The method of claim 3, wherein the host comprises one or more of a computer,
    a workstation computer,
    a server computer,
    a storage server,
    a Storage Attached Network (SAN),
    a Network Attached Storage (NAS) device,
    a Direct Attached Storage (DAS) device,
    a storage appliance,
    a Personal Computer (PC),
    a laptop computer,
    a notebook computer,
    a netbook computer,
    a tablet device or computer,
    an ultrabook computer,
    an electronic reading device (an e-reader),
    a Personal Digital Assistant (PDA),
    a navigation system,
    a (handheld) Global Positioning System (GPS) device,
    an automotive control system,
    an automotive media control system or computer,
    a printer, copier or fax machine or all-in-one device,
    a Point Of Sale (POS) device,
    a cash-register,
    a media player,
    a television,
    a media recorder,
    a Digital Video Recorder (DVR),
    a digital camera,
    a cellular handset,
    a cordless telephone handset, and
    an electronic game.

5. The method of claim 1, wherein the waiting is performed by a controller of a device enabled to service the particular request.

6. The method of claim 1, wherein the waiting is performed by a controller of a device enabled to service the particular request at least in part via operation of a flash memory interface.

7. The method of claim 6, wherein the flash memory interface is compatible with one or more of
    an Open NAND Flash Interface (ONFI),
    a Toggle-mode interface,
    a Double-Data-Rate (DDR) synchronous interface,
    a DDR2 synchronous interface,
    a synchronous interface, and
    an asynchronous interface.

8. The method of claim 1, wherein the waiting is performed by a controller of a device enabled to service the particular request at least in part via accessing of at least one flash memory.

9. The method of claim 8, wherein at least a portion of the at least one flash memory comprises one or more of
    NAND flash technology storage cells, and
    NOR flash technology storage cells.

10. The method of claim 8, wherein at least a portion of the at least one flash memory comprises one or more of
    Single-Level Cell (SLC) flash technology storage cells, and
    Multi-Level Cell (MLC) flash technology storage cells.

11. The method of claim 8, wherein at least a portion of the at least one flash memory comprises one or more of
    polysilicon technology-based charge storage cells, and
    silicon nitride technology-based charge storage cells.

12. The method of claim 8, wherein at least a portion of the at least one flash memory comprises one or more of
    two-dimensional technology-based flash memory technology, and
    three-dimensional technology-based flash memory technology.

13. The method of claim 1, wherein the particular request is communicated at least in part via a storage interface that is compatible with at least one storage interface standard.

14. The method of claim 13, wherein the at least one storage interface standard comprises one or more of a Universal Serial Bus (USB) interface standard,
a Compact Flash (CF) interface standard,
a MultiMediaCard (MMC) interface standard,
an embedded MMC (eMMC) interface standard,
a Thunderbolt interface standard,
a UFS interface standard,
a Secure Digital (SD) interface standard,
a Memory Stick interface standard,
an xD-picture card interface standard,
an Integrated Drive Electronics (IDE) interface standard,
a Serial Advanced Technology Attachment (SATA) interface standard,
an external SATA (eSATA) interface standard,
a Small Computer System Interface (SCSI) interface standard,
a Serial Attached Small Computer System Interface (SAS) interface standard,
a Fibre Channel interface standard,
an Ethernet interface standard, and
a Peripheral Component Interconnect express (PCIe) interface standard.

15. A non-transitory tangible computer readable medium having a set of instructions stored therein that when executed by one or more processing elements cause the processing elements to collectively perform and/or control operations comprising:
    managing a request queue, the managing comprising performing request addition via a tail of the request queue and performing request removal via a head of the request queue;
    adding a particular request to the request queue and assigning a unique identifier to the particular request based at least in part on an offset between the tail and the head at the time of the adding;
    completing the particular request;
    updating a particular one of a plurality of completion status entries as identified by the unique identifier;
    waiting until all requests of the request queue that are older than the particular request are completed; and
    after the waiting, updating the request queue head.

16. The non-transitory tangible computer readable medium of claim 15,
    wherein at least one of the processing elements is comprised in a controller of a device enabled to service the particular request.

17. An apparatus comprising:
    logic circuitry enabled to manage a request queue at least in part by performing request addition via a tail of the request queue and performing request removal via a head of the request queue;
    logic circuitry enabled to add a particular request to the request queue and to assign a unique identifier to the particular request based at least in part on an offset between the tail and the head at the time of the adding;
    logic circuitry enabled to complete the particular request;
    logic circuitry enabled to update a particular one of a plurality of completion status entries as identified by the unique identifier;
    logic circuitry enabled to wait until all requests of the request queue that are older than the particular request are completed; and
    logic circuitry enabled to, after the waiting, update the request queue head.

18. The apparatus of claim 17, wherein at least some of the logic circuitry elements are comprised in a controller of a device enabled to service the particular request.

* * * * *